United States Patent [19]

Ko

[11] Patent Number: 5,743,286

[45] Date of Patent: Apr. 28, 1998

[54] REVERSE FLOW PROOF CONTROL-VALVE FOR A MONO-FAUCET

[75] Inventor: Hsi-Chia Ko, Changhua Hsien, Taiwan

[73] Assignee: Chung Cheng Faucet Co., Ltd., Changhua Hsien, Taiwan

[21] Appl. No.: 675,070

[22] Filed: Jul. 3, 1996

[51] Int. Cl.[6] .................................................. G05D 11/00
[52] U.S. Cl. .......................... 137/119.04; 137/119.03; 137/119.01; 137/597
[58] Field of Search ..................... 137/119.04, 119.03, 137/119.01, 533.17, 533.19, 543.19, 597

[56] References Cited

U.S. PATENT DOCUMENTS

| | | | |
|---|---|---|---|
| 1,593,125 | 7/1926 | Jackley | 137/119.05 |
| 4,577,653 | 3/1986 | Marty | 137/119.04 |
| 4,798,221 | 1/1989 | Crawford et al. | 137/119.04 |

Primary Examiner—Denise L. Ferensic
Assistant Examiner—Joanne Y. Kim
Attorney, Agent, or Firm—Browdy and Neimark

[57] ABSTRACT

A reverse flow proof control valve having a valve shaft, a valve sleeve and a driving block is intended to effectively prevent dirty water or chemicals produced in a fire fighting process from reversely flowing into a household water system via a shower device dropped in a sink, in a tub or on the ground in a fire accident. The valve sleeve is provided with a number of spaced retaining ribs so as to limit the valve shaft to move in a steady and linear manner in operation. A number of spaced supporting rods, forming a frame-like open structure, extend from the bottom of the valve sleeve and terminate with a hoop member. The valve shaft is provided with an additional flanged portion with a engagement journal defined thereunder and a flat cone-shaped driving block is engaged with the bottom end thereof. The driving block has a flat cone-shaped leakage proof cavity at the bottom side thereof so that the skirt of the driving block can be inwardly or outwardly expanded easily, permitiing the same to stop reverse flow by way of a shower device.

1 Claim, 5 Drawing Sheets

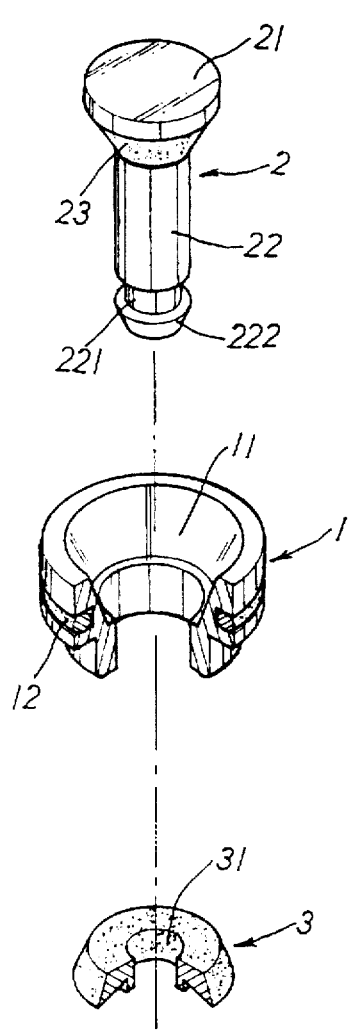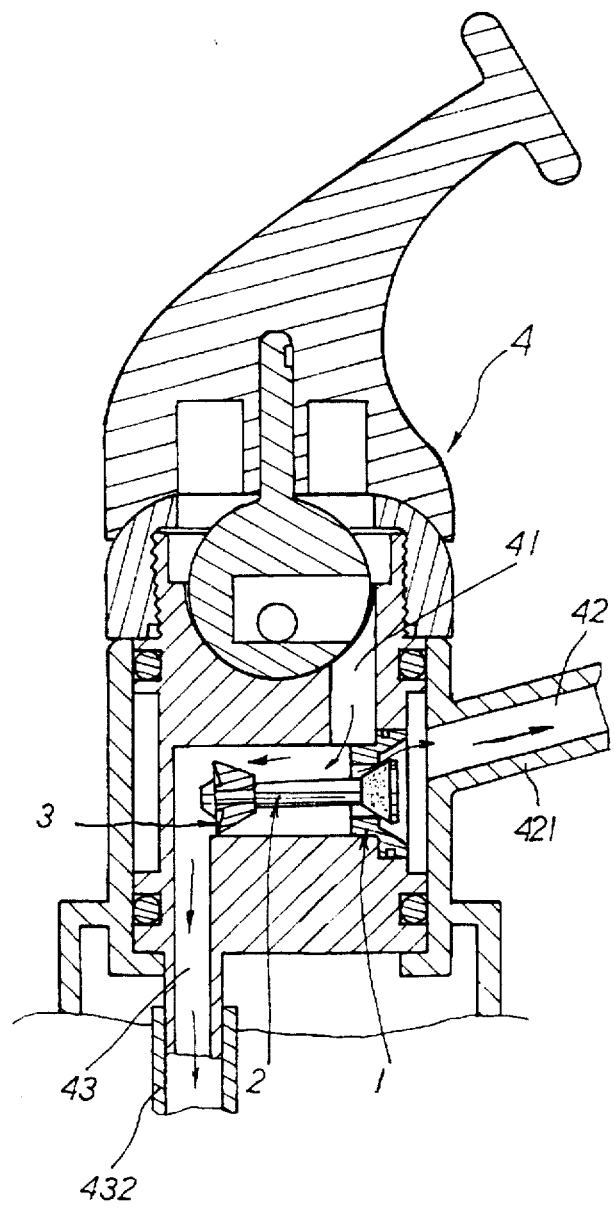
FIG. 1
(PRIOR ART)
FIG. 2
(PRIOR ART)

5,743,286

REVERSE FLOW PROOF CONTROL-VALVE FOR A MONO-FAUCET

BACKGROUND OF THE INVENTION

The present invention relates to an improved reverse flow proof control valve which has a valve shaft, a valve sleeve and a driving block secured to the bottom end of the valve shaft. The valve sleeve has a central through hole having a stepwise or counter sink structure with a number of spaced retaining ribs disposed on the inner wall at the top end thereof so as to limit the valve shaft to move steadily and linearly. From the bottom end of the valve sleeve extend a number of spaced supporting rods that form an open frame structure allowing water to flow therethrough. A hoop member is secured to the end of the supporting frame. The valve shaft having an enlarged head and a cone-shaped sealing portion in connection to a column portion and a flanged portion is disposed near the other end of the column portion with an engagement journal defined thereunder. A cone-shaped bottom end is placed at the end of the valve shaft. A driving block having a flat cone-shaped structure with a circular protrusion disposed at the top thereof, forming a shoulder thereon, is provided with a central hole and a leakage proof cavity defined at the bottom of the driving block. The valve shaft is led through the valve sleeve with the driving block engaged with the engagement journal of the valve shaft. The driving block has a leakage proof cavity and a shoulder can effectively improve the operation of the valve shaft and can prevent dirty water from reversely flowing back into a household water system via the shower device of a faucet.

As shown in FIGS. 1, 2, a prior art control valve is equipped with a valve shaft 2, a valve sleeve 1 and a driving block 3 having a through hole 31. The valve shaft 2 has an enlarged head 21 in connection to a downwardly tapered sealing portion 23. A column portion 22 extends down therefrom with a journal section 221 defined adjacent a cone-shaped bottom end 222. The driving block 3 is secured to the valve shaft 2 by way of the journal 221 after the valve shaft 2 is led through the central hole 11 of the valve sleeve 1.

When such a prior art control valve is installed in a faucet 4, it has the following disadvantages:

1. The valve shaft 2 is not firmly limited to move in a linear manner in operation and it can not move in a steady and firm manner in one aspect and the sealing effect is not satisfactory in another aspect.
2. The driving block 3 has a relatively less accommodating area so that the valve shaft 2 is not easily actuated at low pressure; and the driving block 3 is not easy to bend inwardly to permit impure substances in the water to be expelled.
3. In a fire accident, dirty water or chemicals can be sucked into the household water system via such a prior art control valve during a fire fighting process, when a shower device is dropped in a sink or a tub or on the ground.

SUMMARY OF THE INVENTION

Therefore, the primary object of the present invention is to provide an improved control valve for use on a faucet which has a valve shaft housed in a valve sleeve having a number of retaining ribs defined on the inner wall thereof so as to confine the valve shaft to move linearly and steadily, making the automatic switch of the faucet with certainty.

Another object of the present invention is to provide an improved control valve for use on a faucet which has an improved driving block having a shoulder portion defined thereon so as to expand its water accommodating area. This permits the driving block to be actuated by either a low or a high water pressure. Besides, the skirt of a leak proof cavity of the driving block can be bent inwardly into the cavity so as to permit impure substances to be expelled via the driving block.

One further object of the present invention is to provide an improved control valve which has a flat cone-shaped driving block having a leak proof cavity defined at one side thereof which can be outwardly expanded so as to make the skirt of the driving block in abutment against the inner wall of the faucet so as to prevent dirty water or chemicals from reversely flow into the household water system via a shower device placed in a tub or sink during a fire fighting process.

BRIEF DESCRIPTION OF THE INVENTION

FIG. 1 is an exploded view of a conventional control valve;

FIG. 2 is a sectional diagram showing the operation mode of the conventional control valve;

DETAILED DESCRIPTION OF THE PREFERRED EMBODIMENT

Figure 3:
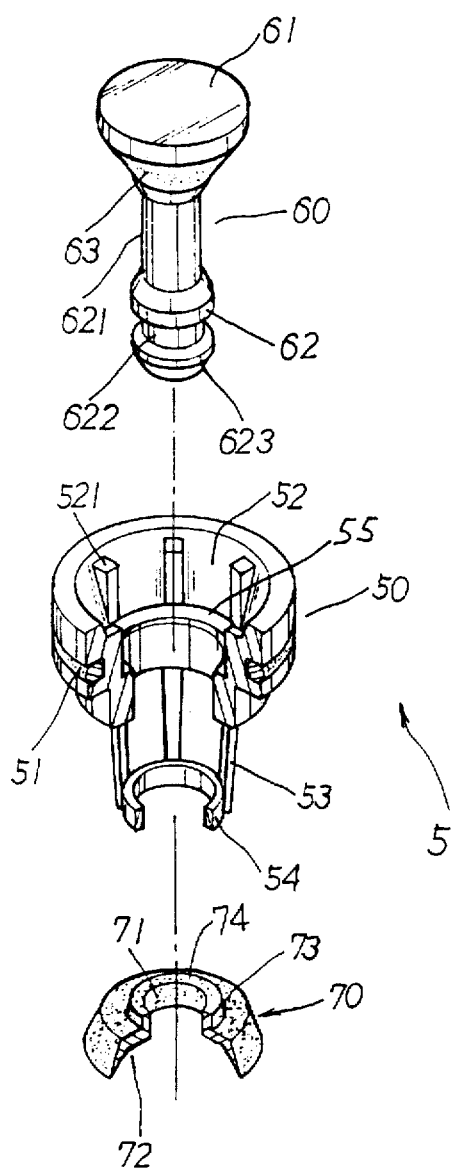
FIG. 3 is an exploded view of the present invention.

Referring to FIG. 3, the reverse flow proof control valve 5 of the present invention comprises a valve sleeve 50, a valve shaft 60 and a driving block 70. The valve sleeve 50 integrally formed is provided with a sealing ring 51 around the outer periphery near the top end thereof and a stepwisely defined or counter sink central hole 52 which has a number of retaining ribs 521 evenly spaced around the inner wall at the top portion thereof. Extending from the bottom end of the valve sleeve 50 are a number of evenly spaced supporting rods 53 which terminates at a hoop member 54, forming an open frame-like structure.

The valve shaft 60 has an enlarged head 61 at the top thereof with a tapered sealing portion 63 extended downwardly therefrom and further connecting to a column portion 621 tapered sealing portion 63 engages against sealing seat 55 when shower outlet duct 43 is opened. To the other end of the column portion 621 is connected a flanged portion 62. An engagement journal 622 is defined right under the flanged portion 62 with a cone-shaped bottom end 623 having the same diameter of the flanged portion 62 further connected thereto.

The driving block 70 made of rubber basically has a flat cone-shaped configuration with the larger base placed at the bottom and a circular protrusion 74 extended upwardly. An engagement hole 71 is defined at the center of the driving block 70. A leakage-proof cavity 72 communicating with the engagemnt hole 71 is disposed at the bottom of the driving block 70. Such structure of the cavity 72 enhances the water accomodating area so as to advance the leaks proof effect. A shoulder 73 defined next to the circular protrusion 74 increases the water accomodating area so as to permit the same to be effective in both the high pressure and low pressure driving action.

Figure 4:
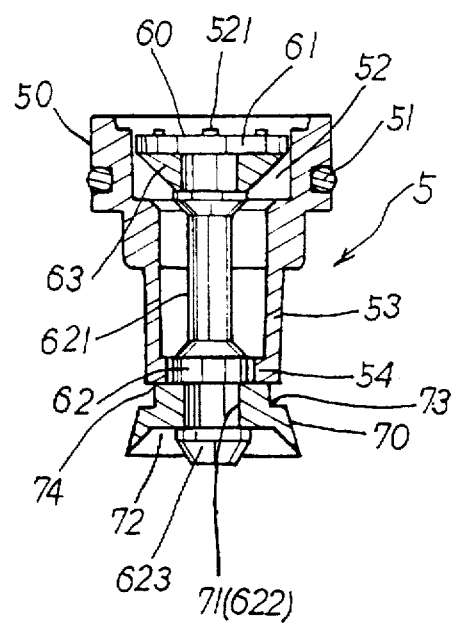
FIG. 4 is a sectional view of the assembly of the present invention.

Referring further to FIG. 4, in the sectional diagram of the present invention, it clearly shows the assembly of the control valve of the present invention in the following manner. In assembly, the valve shaft 60 is led all the way into the stepwise or counter sink central hole 52 of the valve sleeve 50 with the enlarged head 61 then movably confined in Place by way of the retaining ribs 521 defined on the inner wall of the stepwise central hole 52. The enlarged head 61 can not pass through the counter sink central hole 52, only permitting the valve shaft 60 to move up and down in the central hole 52.

The column portion 621 of the valve shaft 60 extends through the bottom of the valve sleeve 50 and further locates in the frame-like structure defined by the evenly spaced supporting rods 53. The cone-shaped end 623 of the valve shaft 60 is led through the engagement hole 71 of the cicular protrusion 74 defined at the top of the driving block 70 and further into the leakage-proof cavity 72 of the driving block 70. The driving block 70 is retained in place by way of the engagement journal 622 of the valve shaft 60. The circular protrusion 74 of the driving block 70 abuts aginst the hoop member 54, as shown in FIG. 2, whereby the valve shaft 60 can move up and down in the stepwise or counter sink central hole 52 of the valve sleeve 50.

Figure 5:
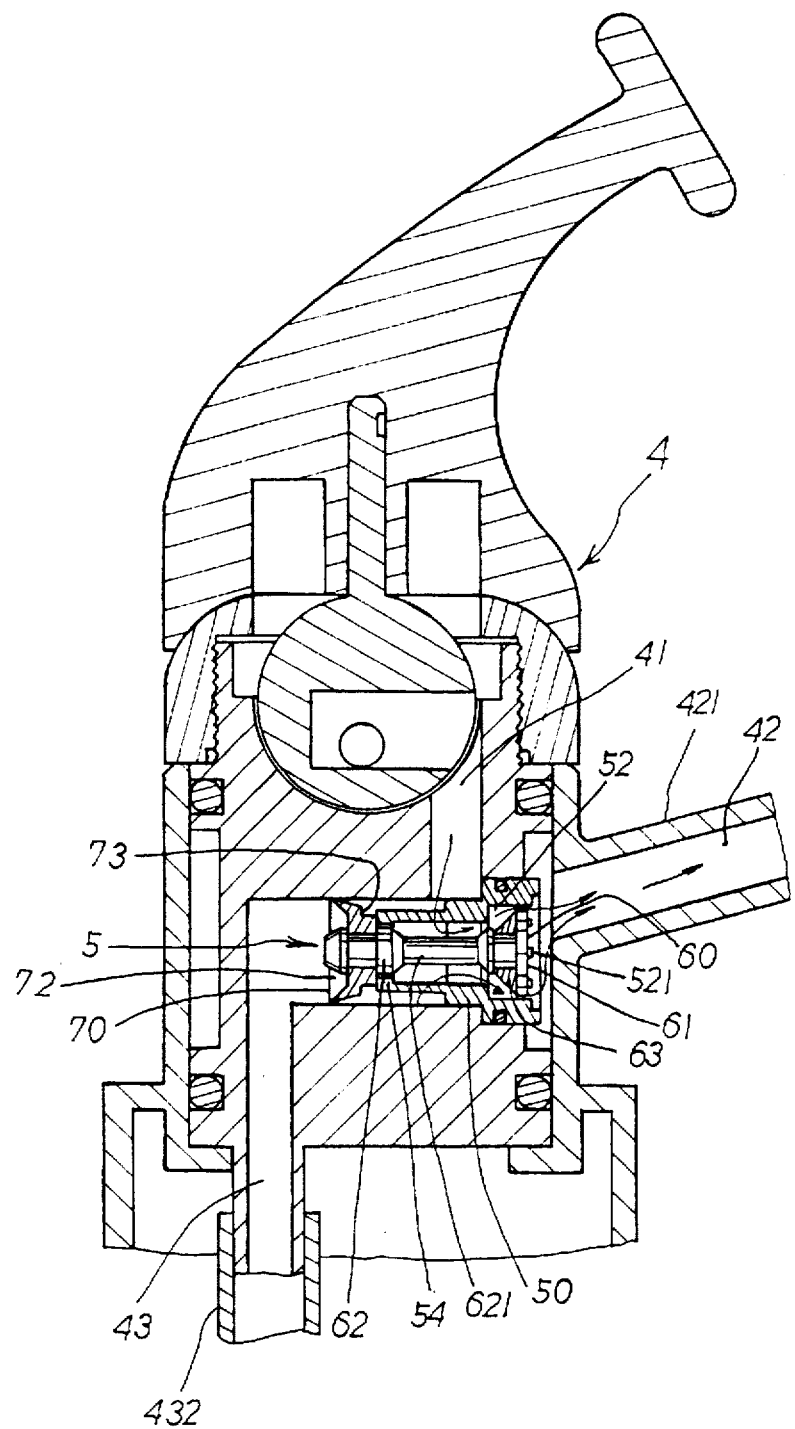
FIG. 5 is a diagram showing one operation mode of the invention.

Referring to FIG. 5, the control valve 5 of the present invention is installed at the intersection of the mixing water inlet duct 41, the faucet water outlet duct 42 and the shower outlet duct 43 of a hot/cold water mixing faucet 4. The water outlet duct 42 ends at an outlet pipe 421 and the shower outlet duct 43 is connected to a joint duct 432 of a shower device 431.

When the shower device 431 of the faucet 4 is shut off, water flowing into the faucet 4 by way of the mixing water inlet duct 41 will be forced into the faucet water outlet duct 42 as a result of the closing of the shower outlet duct 43. In that case, water flowing out of the mixing water inlet duct 41 will be led through the opened frame-like structure formed by the supporting rods 53 and push the tapered sealing portion 63 of the enlarged head 61 of the valve shaft 60 housed in the step-wise central hole 52 of the valve sleeve 50. Thus, with the enlarged head 61 of the valve shaft 60 sliding against the retaining ribs 521 defined on the inner wall of the sleeve 50 and the flanged portion 62 of the valve shaft 60 confined in the hoop member 54, the valve shaft 60 will move linearly in a firm and steady manner when the cone-shaped tapered sealing portion 63 is pushed away from tapered sealing seat 55 to open. As a result, water will rush via the small opening between the sealing portion 63 and the sealing seat 55 of the central hole 52 of the valve sleeve 50 into the faucet water outlet duct 42 and is discharged from the outlet pipe 421.

Figure 6:
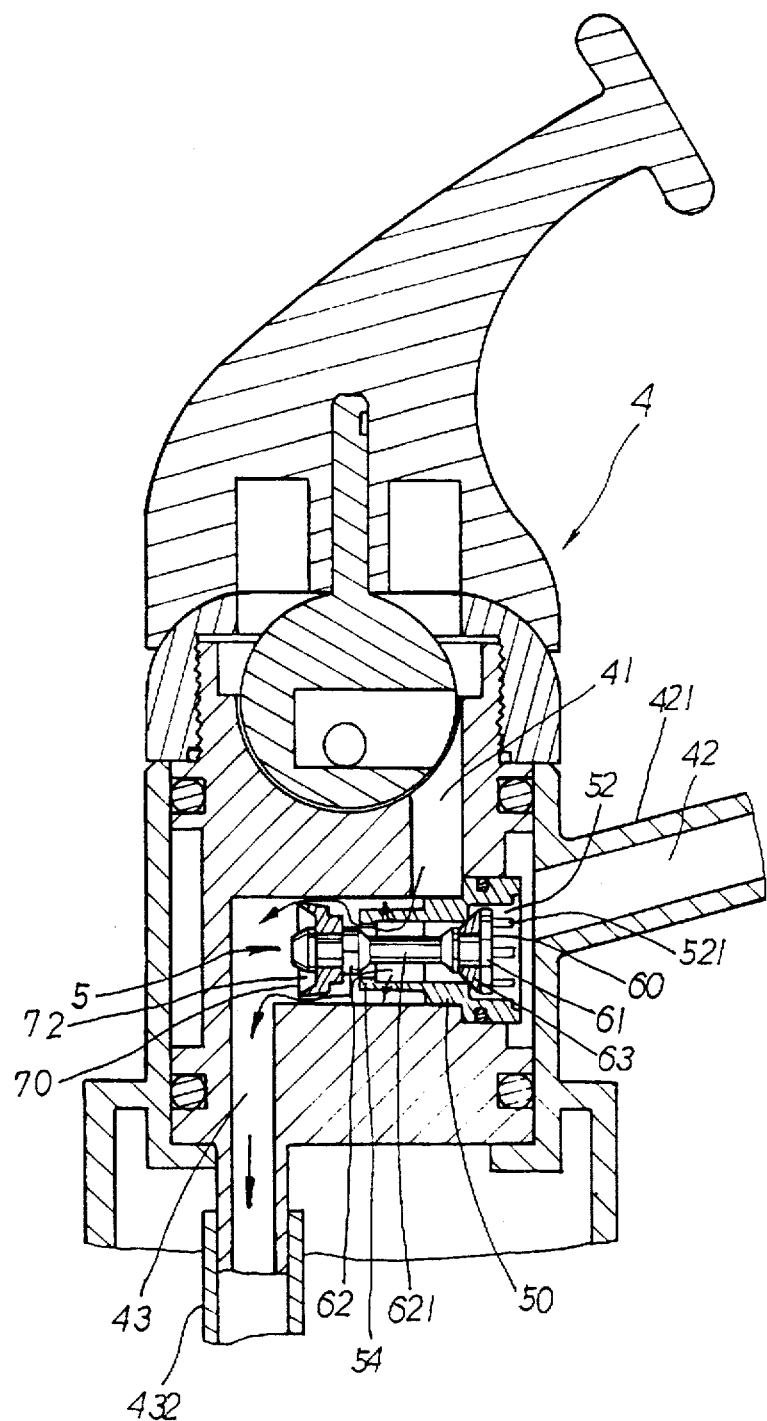
FIG. 6 is a diagram showing a second operation mode of the invention.

As further shown in FIG. 6, when the shower device 431 in connection to the shower outlet duct 43 is open for use, the water discharged from the mixing water inlet duct 41 will be naturally shifted from the faucet water outlet duct 42 as a result of sudden drop of pressure in the shower outlet duct 43. As a result, the shoulder 73 of the driving block 70 is pushed by water and the skirt of the leakage proof cavity 72 is accordingly bent inwardly, permitting water to flow via the opening produced between the inwardly bent driving block 70 and the wall of the faucet at the intersection and is discharged out of the shower outlet duct 43. At the same time, the impurities in the water can be discharged therethrough.

As a result of the water pressure exerted on the shoulder 73 of the driving block 70, the valve shaft 60 is slid linearly toward the shower outlet duct 43 whereby the tapered leakage-proof sealing portion 63 of the valve shaft 60 will engage sealing seat 55 and block the stepwise central hole 52 of the valve sleeve 50, making the faucet water outlet duct 42 fully blocked.

Figure 7:
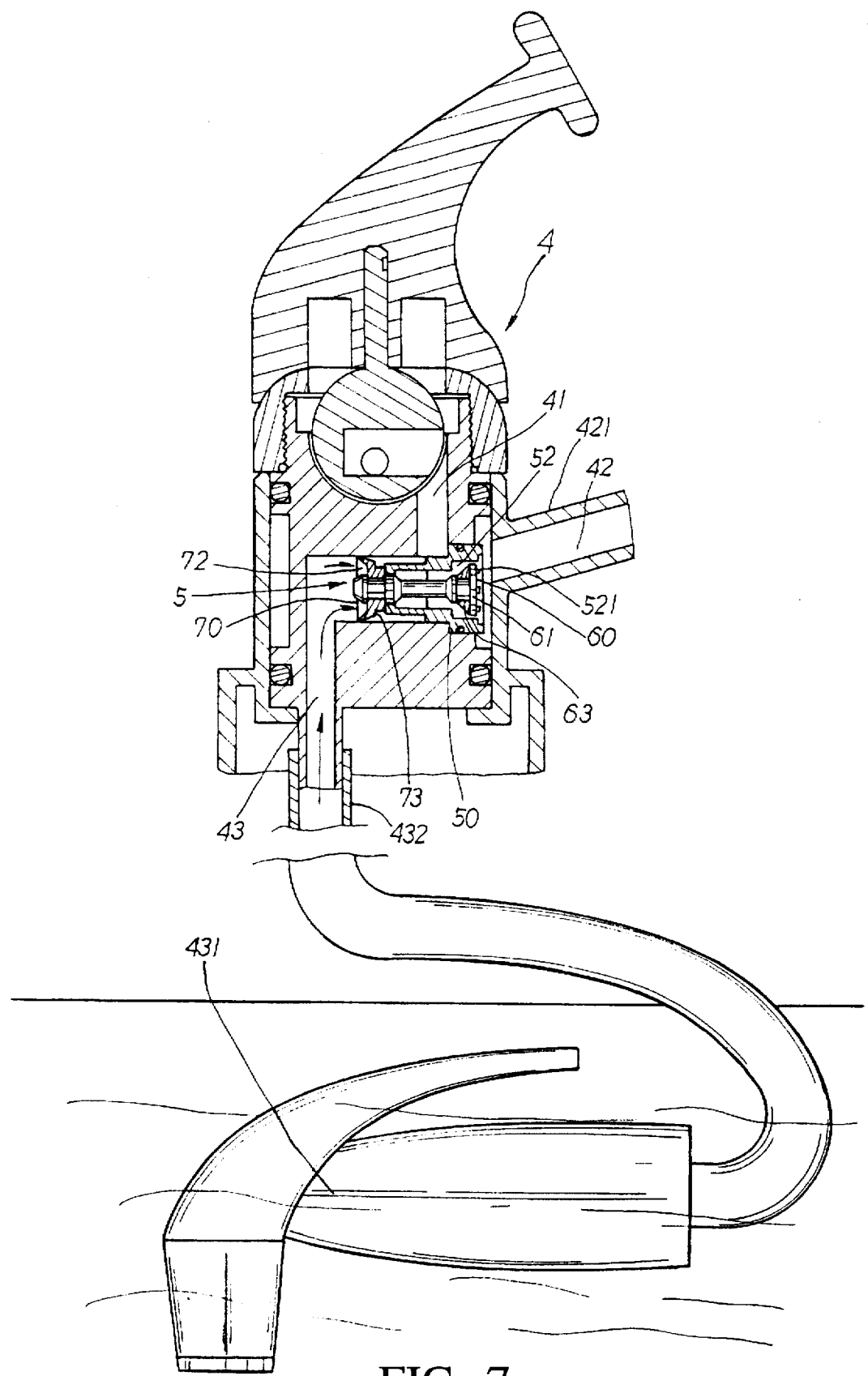
FIG. 7 is a diagram showing the way of prevention of dirty water or chemicals from reversely flowing into a household water system by way of the faucet.

Referring to FIG. 7, the diagram shows the way of how a reverse flow from the shower device can be stopped in an effective manner. When a fire accident takes place, in most cases, the shower device will be dropped at random on the ground or in a tub or sink in emergency. So, the shower device 431 easily immerges in dirty water or chemicals in a fire fighting process. In a fire fighting process, water will be pumped in a mass from the same source of a household water system. In such a case, a reverse-flow suction force will be produced in the mixing water inlet duct 41 of the faucet 4. Because the relay control valve 5 is horizontally placed at the bottom end of the mixing water inlet duct 41, the driving block 70 is subject to a suction force toward the faucet water outlet duct 42 accordingly. In the meanwhile, the shower device 431 immerging in a sink or in dirty water or fire fighting chemicals is subject to suction force as well, causing dirty water to reversely flow into the faucet. The dirty water will exert pressure on the flat-cone shaped leakage proof cavity 72 of the driving block 70 so as to make the skirt of the driving block 70 to abut against the inner wall at the intersection of the faucet 4. The larger the suction force is, the firmer the skirt of the leakage proof cavity 72 abuts against the inner wall of the faucet 4 whereby dirty water or chemicals can be stopped from reversely flowing into a household water system in a fire fight process.

It becomes apparent from the proceeding account of the operation modes of the present invention that the improved control valve has the following advantages:

1. The valve shaft 60 can be surely and steadily confined to move linearly in the valve sleeve 50 so as to make the automatic switch more certainly.
2. The shoulder 73 of the driving block 70 produces relatively larger accommodating area so as to actuate the driving block 70 easily in either a low or a high pressure situation; the skirt of the leakage proof cavity 72 can be inwardly bent in operation so as to make impure debris to be easily expelled.
3. The leakage proof cavity 72 of the driving block 70 of the relay control valve 5 can expand outwardly, causing the skirt thereof to abut against the wall of the faucet so as to prevent dirty reverse flow from entering into household water system by way of a shower device accidently.

I claim:

1. A reverse flow proof control valve comprising a valve shaft, a valve sleeve in which said valve shaft is movably housed and a driving block attached to a first end of said valve shaft, said control valve being used in a fixture to automatically shift the paths of water discharged from a faucet or shower head;

said valve shaft having an enlarged head with a downwardly tapered leak proof sealing portion, said head fixed to a column, a circular flanged portion spaced apart from a flat cone-shaped bottom second end on said column with an engagement journal defined between said circular flanged portion and said flat cone-shaped bottom second end;

said valve sleeve having a counter sunk portion with a central hole through a center thereof, a plurality of spaced retaining ribs defined on an inner wall of said counter sunk portion confining said enlarged head of said valve shaft to slidable linear movement in said valve sleeve, a sealing seat adjacent to said retaining ribs for engagement to said tapered leak proof sealing portion, a sealing ring on an outer periphery of said valve sleeve, a plurality of spaced supporting rods extending from said counter sunk portion to a closed circular hoop member, said supporting rods and said closed circular hoop member forming an open frame structure below said sealing seat which permits water to flow through said central hole when said tapered leak proof sealing portion is disengaged from said sealing seat;

said driving block having a flat cone-shaped structure with a circular protrusion defined on a top thereof, a flat cone-shaped cavity formed at the bottom thereof, said flat-cone shaped structure having a through hole disposed at the center thereof, wherein said engagement journal engages the flat cone-shaped structure;

wherein said valve shaft is housed in said valve sleeve with said enlarged head received in said counter sunk structure for slidable engagement with to said retaining ribs; said column of said valve shaft extending through said open frame structure of said valve sleeve with said flanged portion moveable through said closed circular hoop member, wherein said flat cone-shaped driving block and said circular protrusion are respectively sealably engaged to said fixture and against said closed circular hoop member when said tapered leak proof sealing portion is opened to discharge water from said faucet, and wherein said flat cone-shaped driving block and said circular protrusion are respectively disengaged from said fixture and said closed circular hoop member when said tapered leak proof sealing portion is engaged to said sealing seat to discharge water from said shower head.

\* \* \* \* \*